United States Patent [19]

Matsubara

[11] 4,066,724
[45] Jan. 3, 1978

[54] METHOD FOR COLLECTING INDUSTRIAL VAPORS AND PARTICULATE MATTER

[75] Inventor: Shigeo Matsubara, Yokohama, Japan

[73] Assignee: Kohkoku U.S.A., Inc., Everett, Wash.

[21] Appl. No.: 730,603

[22] Filed: Oct. 7, 1976

Related U.S. Application Data

[62] Division of Ser. No. 602,231, Aug. 6, 1975, Pat. No. 3,999,911.

[30] Foreign Application Priority Data

Dec. 25, 1974 Japan .................................. 49-147968

[51] Int. Cl.² .......................... B03C 3/00; B29D 7/14
[52] U.S. Cl. ........................................ 264/39; 55/2;
 55/385 A; 55/DIG. 18; 264/24; 264/40.3;
 264/40.6; 264/101; 264/175
[58] Field of Search ................. 425/73, 75, 72 R, 445;
 98/115 R, 115 SB, 115 VM; 264/24, 37, 39,
 101, 102, 175, 40.3, 40.6; 55/2, 101, 385 R, 385
 A, DIG. 18

[56] References Cited

U.S. PATENT DOCUMENTS

| 2,280,984 | 4/1942 | Thurnau | 98/115 R |
| 2,397,197 | 3/1946 | Newman | 98/115 R |
| 2,912,716 | 11/1959 | Frownfelter et al. | 425/73 X |
| 3,470,288 | 9/1969 | Dunnington et al. | 264/175 X |
| 3,502,757 | 3/1970 | Spencer | 264/39 X |
| 3,709,210 | 1/1973 | Matthews | 128/191 A X |
| 3,852,392 | 12/1974 | Davis et al. | 264/101 X |

Primary Examiner—Jan H. Silbaugh
Attorney, Agent, or Firm—Graybeal, Barnard & Uhlir

[57] ABSTRACT

The vapor and particulate matter emitting equipment is enclosed within walls of an electrostatically charged clear plastic sheet material. The enclosures are connected at their tops to hoods which are connected to ducting leading to an exhaust fan. The vapors are contained within the enclosures until they can be evacuated by the fan. The particulate matter is attracted to the electrostatically charged sheet material.

1 Claim, 3 Drawing Figures

METHOD FOR COLLECTING INDUSTRIAL VAPORS AND PARTICULATE MATTER

CROSS-REFERENCE TO RELATED APPLICATION

This is a division of my pending prior application Ser. No. 602,231, filed Aug. 6, 1975, now U.S. Pat. No. 3,999,911, and now entitled APPARATUS FOR COLLECTING INDUSTRIAL VAPORS AND PARTICULATE MATTER.

BACKGROUND OF THE INVENTION

1. Field of the Invention

This invention relates to a method and apparatus for reducing to acceptable limits the amount of toxic fumes, other vapors, and particulate matter in the air within a manufacturing plant for polyvinyl chloride materials, or other materials presenting similar pollution problems.

2. Description of the Prior Art

In the manufacture of polyvinyl chloride film or sheet materials, a thermal plastic resin, a plasticizer, a stabilizer, fillers and pigments are combined and mixed together in a blender. The composition is then further mixed and heated within mixing rolls. The composition is then conveyed while still hot to a calendaring machine to be rolled into a film or sheet. The heating causes some of the materials in the composition to evaporate, and in other ways causes smoke, oily vapor or fumes, dust and odors to be produced. Herein the term "vapor" is used to describe the entire fluid by-products of the manufacturing process and the term "particulate matter" is used to describe the small solid by-products of such process and dust drawn in from the region about the equipment.

It is known to use exhaust ducts and suction fans located over the heating and mixing equipment for collecting and removing the undesirable vapors and particulate matter. However, the known exhaust ducts and suction systems have not been particularly effective. They do not remove enough of the undesirable substances. It does not help to increase the exhaust and suction capacity of the fans because if this were to be done it would also be necessary to increase the temperature of the composition during mixing, and such a change would have an adverse effect on the quality of the product to be manufactured. Also, if the dust in the room is stirred up unnecessarily, such as by increasing the suction, and this dust adheres to the composition, it may show up as foreign matter on the film or sheet product, or cause damage such as the opening up of pin holes in the surface of such product.

The fault of the conventional exhaust systems could be avoided by locating each piece of machinery used in the manufacturing process within a separate room and then regulating the air and ventillation for each room so that both an adequate temperature is maintained and the proper amount of ventilation is provided for each part of the operation. However, the cost of providing separate rooms for each piece of equipment would be prohibitive. Furthermore, the separate room arrangement would not provide adequate protection against undesirable vapors for all stages of operation. Current government standards prohibit even a small amount of certain toxic gases within a work area. It would not be possible to locate the equipment which emits such toxic gases in a separate ventilated room and by this procedure reduce the amount of the toxic gas in the room down to below the permissible level.

SUMMARY OF THE INVENTION

The vapor and particulate matter control system of the present invention provides a simple way of removing the harmful elements from the workplace atmosphere, while at the same time preserving the conditions which contribute to making a good quality product.

According to the invention, the mixing rolls, the conveyors and the calendar are enclosed by walls constructed from a clear, electrostatically charged sheet or film material which is attached directly to the exhaust hoods. The enclosures keep the compound from cooling. They also contain the harmful atmospheric elements to within the enclosure until they can be removed by the exhaust fans. The enclosure walls can be made from vinyl chloride resins sheet or polyethylene resin sheet, but the material must be clear and preferably is electrostatically charged. It is also desirable that the material be flame resistant and self-extinguishing.

The walls may be made from either a single layer or a multi-layer sheet material. If plural layers of the material are used, it is preferred that they be joined together in such a manner so that an air space is left between them, to provide improved heat installation characteristics.

Preferably, the closure wall is made in several sections, so that a section of it can be replaced independently of the other sections. The electrostatic attraction is used for collecting particulate matter. Once a particular section reaches its capacity of collected particulate matter, it can be replaced independently of the other, less soiled sections of the enclosure.

DESCRIPTION OF THE PREFERRED EMBODIMENT

Figure 1:
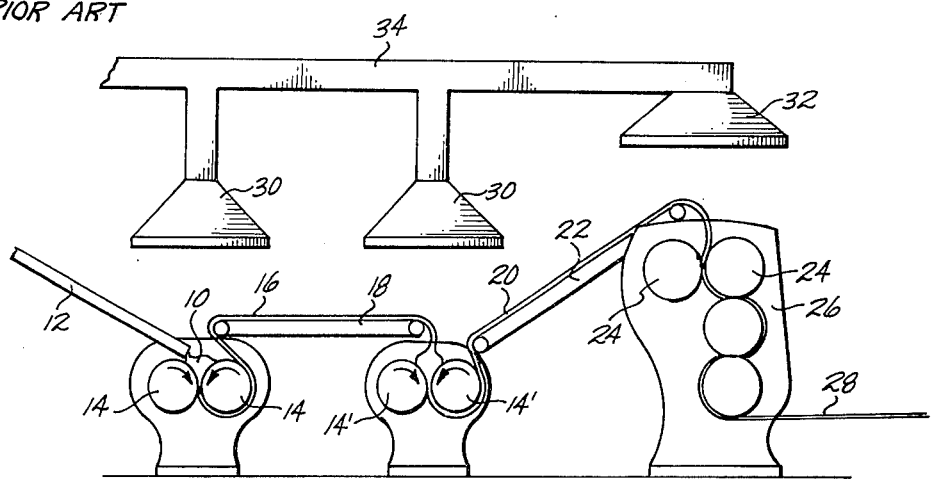
FIG. 1 is a diagrammatic side elevational view of a prior art installation, showing three pieces of equipment for handling and heating the plastic material, with a hood being located over each piece of equipment and all hoods being connected to a common collection duct.

Referring first to FIG. 1, it is old to manufacture film and sheet plastic materials in the following manner: a thermal plastic resin, a plasticizer, a stabilizer, fillers and pigments are combined and mixed together in a blender (now shown). The resulting composition 10 is delivered by conveyor means 12, in a form resembling a stiff batter, into the upper nip of a first pair of heated rolls 14. The partially mixed composition leaves the rolls 14 in the form of a ribbon 16. The ribbon 16 is moved by endless conveyor means 18 into the upper nip of second stage heating and mixing rolls 14'. The now thoroughly mixed composition leaves the rolls 14' in the form of a ribbon 20 which is elevated by a second endless conveyor 22 and fed into the upper rolls 24 of a calendaring machine 26. Within calendaring machine 26 the composition is rolled into a film or sheet 28 which travels from calendar 26 to cooling and or embossing rolls (not shown).

It is known to place a vapor collecting hood 30 over each piece of heating and mixing equipment in a similar hood 32 over the calendar machine, with the hoods 30, 32 being connected to duct means 34 which includes a suction fan (not shown) for drawing vapors into the hoods 30, 32.

As earlier explained, the heating which occurs in the heating and mixing equipment 14, 14' causes some of the materials in the composition to evaporate, and in other ways causes smoke, oily vapor or fumes, dust and odors to be produced. It has been found that exhaust duct and suction systems of the type shown by FIG. 1 are not particularly effective, as they do not remove enough of the undesirable substances. Attempts to increase the quantity of undesirable substances removed by merely increasing the suction and exhaust capacity have proven to be unsuccessful. Increasing the suction lowers the temperature of the composition and also tends to draw in dust from the region surrounding the hoods. The temperature change adversely affects the quality of the final product and this problem is not solvable by increasing the amount of heat added by the mixing rolls 14, 16. The dust which is stirred up adheres to the compound and shows up later as foreign matter or causes damage, such as the opening up of pin holes in the film surface.

Figure 2:
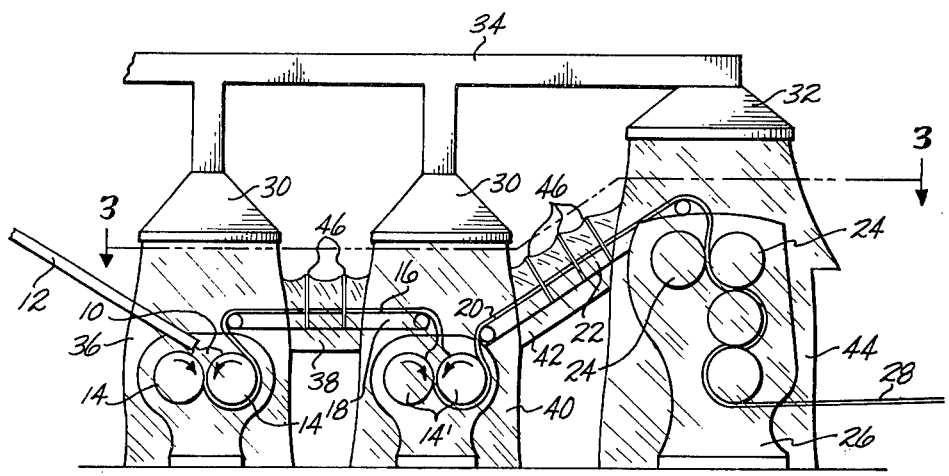
FIG. 2 is a view like FIG. 3, but showing the use of the plastic sheet walled enclosures of the present invention.
Figure 3:
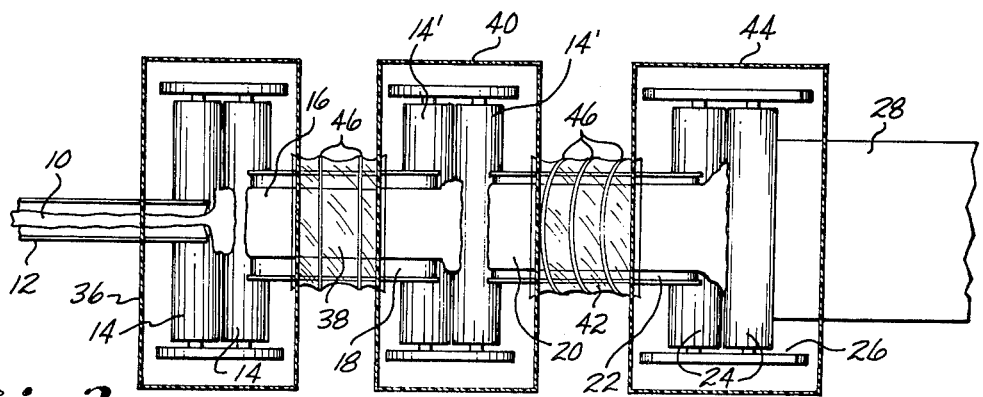
FIG. 3 is a top plan sectional view taken substantially along line 3—3 of FIG. 2.

Referring now to FIGS. 2 and 3, in accordance with the present invention, walls 36, 38, 40, 42, 44 of a clear plastic sheet material are provided to form enclosures for the heating and mixing rolls 14, 14', the conveyors 18, 22 and the calendaring machine 26. By way of typical and therefore non-limitive example, semi-circular hoops 46 are connected at their ends to the frame means for the conveyors 18, 22 and the plastic material is draped over them, in covered wagon fashion, to form the enclosures 38, 42. The enclosures 36, 40, 46 are constructed in the form of four-sided tent-like structures. Openings are formed in the sidewalls of the enclosures 36, 40, 44 at the opposite ends of the enclosures 38, 42.

In FIG. 2 the side walls of the enclosures 36, 40, 42 are shown to depend from the hoods 30, 32 all the way down to the floor. However, in some installations it is only necessary to extend the walls downwardly to a level only slightly below the vapor emitting level of the equipment.

The enclosures 36, 38, 40, 42, 44 can be manufactured from sheet or film vinyl chloride resin or polyethylene resin of a type that is electrostatically charged. It is also desirable that the sheet materials that are used be flame resistant or self-extinguishing.

The particulate matter that is in the air within the enclosures is electrostatically attracted to the enclosure forming material. Preferably, the enclosures 36, 38, 40, 42, 44 are constructed in sections which can be individually replaced whenever they become soiled by the particulate particles adhered thereto.

The operation of the present invention and its effectiveness will now be shown by a comparison of results obtained by an installation of the type shown by FIG. 1 of the drawing with a second installation of the type shown by FIGS. 2 and 3 of the drawing.

1. Effectiveness in Removing Smoke Exhaust

Before installing an apparatus according to the invention, 105.5 m³/min. of exhaust was removed, but not all of the harmful atmospheric elements were sucked into the ducts; there was some back-flow into the room; and smoke was visible about the room. After installation of apparatus according to the invention, however, the smoke was drawn out of by the ducts and none remained in the room. Moreover, the volume of exhaust was only 70.4 m³/min., but this was seen to be sufficient. The floor size of the room in which the equipment was located was 72 m².

2. Effectiveness in Reduction of Energy Consumption

A. Reduction of Volume of Exhaust

As can clearly be seen by the above description of exhaust volume when exhausting smoke,

| | |
|---|---|
| exhaust volume prior to installation | 105.5m³/min |
| exhaust volume after installation | 70.4m³/min | it can be seen that a 33.3% reduction of exhaust volume was obtained.

B. Economy of Heat Calories

This computation for the installation of the device is based on the volume of exhaust and the difference in room temperature (caused by the exhaust), and on the amount of radiant heat drawn out with the exhaust. The difference between the two calculations has been computed as the effectiveness in reducing (heat waste).

Table 1

| | Exhaust Volume | Temperature Difference | Exhausted Heat Energy |
|---|---|---|---|
| Before Installation of Device | 105.5 m³/min | 21.0° C | 686.8 Kcal/min |
| After Installation | 70.4 m³/min | 23.5° C | 512.9 Kcal/min |
| | | Difference | 173.9 Kcal/min |

According to these calculations a 25.3% reduction in the amount of heat energy accompanying the exhaust was obtained.

Figuring a 24 hour-a-day, 30 day-per-month operation, the computation of the amount of enery saved is approximately 7,500,000$_{Kcal}$/month.

3. Reduction of Amount of Defective Product

After installing this device a 0.18% improvement in the rate of defective product manufacture over previous levels was achieved.

In this manner a conspicuous improvement in efficiency was reached, and this was made possible without the expenditure of large sums of money.

4. Reduction of VC Gas Levels

In a PVC film and sheeting plant where a system according to the invention was installed, the University of Washington (monitoring at the request of OSHA) found that the result of gas measurement showed VC gas concentrations as follows:

| | |
|---|---|
| Mixing roll - pre film making tubes | 0.1 ppm |
| Compound Room-high speed mixer floor | 0.1 ppm |
| Head of Strainer-between 26" & 22" mixing roll | 0.4 ppm |
| On Platform-where PVC film is extruded | 0.4 ppm |
| 26"Mixer-at platform where it comes off roll | 0.1 ppm |
| Air outlet from Mixer-on 2nd floor | 0.3 ppm |
| Main Floor Ambient Air - 20' from Calendar Machine, 8' from wall | 0.1 ppm |

Prior to the installation of this device, all of the above readings showed levels of 2-10 ppm.

What is claimed is:

1. In the manufacture of film or sheet plastic products from plastic resins which are heated and mixed in mixing equipment and are then conveyed by conveyor means to and through a calendaring machine, a method of effectively collecting and removing by-product vapors and particulate matter, comprising:

positioning hood means over at least a portion of the heat and mixing equipment, the conveying means and the calendaring machine;

providing walls of an electrically statically charged clear plastic sheet material which are connected to their tops about border portions of the hood means and which depend therefrom, so as to form vapor collecting enclosures for the mixing and heating equipment, the conveying means and the calendaring machine;

providing duct means extending from the hood means;

providing fan means connected to the duct means for drawing vapors upwardly from said enclosures, through the hood means and then through the duct means, including controlling the rate of vapor removal by the fan means to in this manner maintain the temperature within the enclosures at the level required for production of a quality final product; and collecting the particulate matter on said material by electrostatic attraction, and replacing the clear plastic sheet material once it has reached its capacity of collected particulate matter.

* * * * *